(12) United States Patent
Kim et al.

(10) Patent No.: US 11,107,187 B2
(45) Date of Patent: Aug. 31, 2021

(54) GRAPH UPSCALING METHOD FOR PRESERVING GRAPH PROPERTIES

(71) Applicant: DAEGU GYEONGBUK INSTITUTE OF SCIENCE AND TECHNOLOGY, Daegu (KR)

(72) Inventors: Min Soo Kim, Daegu (KR); Himchan Park, Chungcheongnam-do (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 40 days.

(21) Appl. No.: 16/541,628

(22) Filed: Aug. 15, 2019

(65) Prior Publication Data

US 2020/0065939 A1    Feb. 27, 2020

(30) Foreign Application Priority Data

Aug. 21, 2018    (KR) .................. 10-2018-0097551

(51) Int. Cl.
*G06T 3/40* (2006.01)
*G06T 1/20* (2006.01)
*G06F 16/901* (2019.01)

(52) U.S. Cl.
CPC .......... *G06T 3/403* (2013.01); *G06F 16/9024* (2019.01); *G06T 1/20* (2013.01)

(58) Field of Classification Search
None
See application file for complete search history.

(56) References Cited

U.S. PATENT DOCUMENTS

| 10,242,065 B1* | 3/2019 | Starling | G06F 16/2246 |
| 2015/0033106 A1* | 1/2015 | Stetson | G06F 16/904 |
| | | | 715/215 |

(Continued)

FOREIGN PATENT DOCUMENTS

| KR | 2013-0095516 | 8/2013 |
| KR | 10-1678131 | 12/2016 |

(Continued)

OTHER PUBLICATIONS

J Leskovec, Jure, and Christos Faloutsos. "Scalable modeling of real graphs using kronecker multiplication." Proceedings of the 24th international conference on Machine learning. 2007. (Year: 2007).*

(Continued)

*Primary Examiner* — Tony Mahmoudi
*Assistant Examiner* — Umar Mian
(74) *Attorney, Agent, or Firm* — Hauptman Ham, LLP (57) ABSTRACT

A graph upscaling method and apparatus is disclosed. The graph upscaling apparatus may store, in a main memory, original graph data including topological data including a vertex and an edge, determine a parent edge using a hash function and the original graph data, and generate a new edge based on the determined parent edge. The graph upscaling apparatus may store, in a main memory, original graph data including topological data including a vertex and an edge, allocate identities (IDs) of edges to be generated to cores included in a central processing unit (CPU) based on the number of the cores, and generate new edges based on the IDs of the edges using a hash function and the original graph data.

8 Claims, 10 Drawing Sheets

(56) References Cited

U.S. PATENT DOCUMENTS

| | | | |
|---|---|---|---|
| 2017/0091246 A1* | 3/2017 | Risvik | G06T 3/0031 |
| 2018/0081937 A1* | 3/2018 | Broecheler | G06F 16/2453 |
| 2019/0043161 A1* | 2/2019 | Brooks | G06T 3/0031 |
| 2019/0342372 A1* | 11/2019 | Lee | H04L 67/10 |

FOREIGN PATENT DOCUMENTS

| | | |
|---|---|---|
| KR | 10-1795848 | 12/2017 |
| KR | 2018-0025102 | 3/2018 |

OTHER PUBLICATIONS

Zhang, J. W and Y. C. Tay. "GSCALER: Synthetically Scaling A Given Graph." EDBT. vol. 16. 2016. (Year: 2016).*

Jiangwei, Zhang. Synthetically Scaling an Empirical Dataset. Diss. National University of Singapore (Singapore), 2018. (Year: 2018).*

Leskovec, et al. "Kronecker Graphs: An Approach to Modeling Networks", Journal of Machine Learning Reserach, Feb. 2010, pp. 985-1042, vol. 11.

\* cited by examiner

FIG. 9

GRAPH UPSCALING METHOD FOR PRESERVING GRAPH PROPERTIES

This application claims the benefit under 35 USC § 119(a) of Korean Patent Application No. 10-2018-0097551 filed on Aug. 21, 2018, in the Korean Intellectual Property Office, the entire disclosure of which is incorporated herein by reference for all purposes.

BACKGROUND

1. Field

The following description relates to a method of upscaling a scale-free graph to a graph of a greater scale in a parallel processing machine, and more particularly, to a method of upscaling an original graph to a graph of a greater scale while maintaining a structural graph property by adding, to the original graph, an edge through evolutionary preferential attachment without sampling or parameterizing the original graph in a parallel processing machine.

2. Description of Related Art

In a field of relational database, comparing respective levels of performance of different systems may be important for relevant studies and industries. For fairness in such comparison of relational database systems, benchmarks such as TPC-DS, TPC-H, TPC-C, and the like of Transaction Processing Performance Council (TPC) may be used. For example, in a field of graph database, numerous graph processing systems including, for example, GraphLab and PowerGraph of Carnegie Mellon University, Pregel of Google, and Giraph and GraphX of Apache, and numerous graph database systems including, for example, Neo4j, GraphDB, OrientDB, Blazegraph, and Virtuoso, may be used. For the fair comparison of performances of such graph systems, benchmarks to be used may be important.

Graph data used as a benchmark for graph database systems may be large-scale synthetic graph data or actual large-scale graph data. The large-scale synthetic graph data may comply with a standard model such as recursive matrix (RMAT), Kronecker, and Barabasi-Albert graphs. In a case of the large-scale synthetic graph data, large-scale data may be relatively readily generated, although the data has properties different from those of an actual graph. In a case of the actual large-scale graph data, significant benchmarking may be performed because it is actual data, although its scale is limited.

The graph data may have properties such as simplicity and universality and may thus be widely used to model a real-world object in numerous fields of application including, for example, social network, web, business intelligence, biology, and neuroscience. As a size of graphs to be processed by numerous application programs such as graph-based online transaction processing (OLTP) of queries, Internet of things (IoT), and human connectome increases exponentially, there is also a growing desire for a rapid and scalable graph processing method and a synthetic graph generating method.

However, large-scale actual graphs are not various. In addition, despite the presence of numerous synthetic graph generating methods using an RMAT or Barabasi-Albert model, results produced by the synthetic graph generating methods may have properties greatly different from those of actual graphs. For example, in a case of Gscaler, main properties of an original graph may not be maintained. In addition, when upscaling the original graph to a large-scale graph, the upscaling may result in a failure due to a long run time or a lack of memory.

Thus, to obtain various graphs in terms of graph scale and property, there is a desire for a graph upscaling method to upscale a graph to a graph of a greater scale using an original actual graph while maintaining a graph property. In addition, for an existing graph upscaling method, there is a desire for a system that may upscale an extremely large-scale graph because the existing graph upscaling method may upscale only a graph of an extremely limited scale.

As described above, although a need for a method of generating a graph of a greater scale while maintaining a structural property of graph data has become more significant, a more effective method of upscaling graph data to be of large scale while resolving the issues described above has not be developed yet.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect provides a method of upscaling a scale-free actual graph to a graph of a greater scale in a parallel processing machine. In detail, the method may generate a graph of a greater scale while maintaining a structural property of an original graph by adding, to the original graph, an edge through evolutionary hash-based and recursive preferential attachment without sampling or parameterizing the original graph in a parallel processing machine.

Dissimilar to existing methods that sample and parameterize a graph, the method may use evolutionary graph upscaling without decomposing an original graph, and may thus maintain a structural property of the original graph.

The method may not require preprocessing including sampling and parametrization, and thus may effectively obtain an upscaled graph through graph upscaling. In addition, the method may determine an edge based on a hash function, and may thus enable effective graph upscaling through parallelization.

In addition, the method may perform a recursive hash function on an original graph when generating a new edge, without loading all graphs generated in an upscaling process into a memory, and may thus perform graph upscaling without limitations in terms of scale using a memory corresponding to only the original graph.

In addition, the method may be fast in generation by a factor of 1680 or greater times in terms of speed, compared to existing synthetic graph generating and upscaling methods.

In addition, the method may be significantly effective in terms of scalability because it upscales a graph up to a trillion-unit scale as long as only a size of an original graph is loadable in a memory, compared to existing synthetic graph generating and upscaling methods which upscale a graph to a billion-unit scale.

In addition, in terms of maintaining a graph property, the method may be effective in upscaling an original graph to a graph of a greater scale while maintaining a structural property of the original graph through preferential attachment using a mechanism by which the graph evolves over time, without sampling and parameter extraction, whereas existing synthetic graph generating and upscaling methods may upscale a graph through sampling and parameter extraction, and thus lose most of structural properties of the original graph in a process of preprocessing including graph decomposition and parameter extraction.

Further, the method may apply graph upscaling to a trained small artificial neural network in addition to graphs, and thus upscale the network to an artificial neural network having a higher level of accuracy.

According to an example embodiment, there is provided a graph upscaling method including storing, in a main memory, original graph data including topological data including a vertex and an edge, determining a parent edge using a hash function and the original graph data, and generating a new edge based on the determined parent edge.

The determining of the parent edge may include determining whether a first parent edge for the new edge is included in the original graph data, determining a second parent edge for the first parent edge by performing a recursive operation in response to a determination that the first parent edge is not included in the original graph data, and determining the first parent edge based on the determined second parent edge.

The graph upscaling method may further include determining a current scale factor based on an identity (ID) of the new edge. The parent edge may be determined based further on the determined current scale factor.

The determining of the parent edge may include determining an ID of the parent edge, and determining a direction of the parent edge.

The graph upscaling method may further include determining the current scale factor based on the ID of the new edge. The determining of the ID of the parent edge may include determining a hash function value for the ID of the new edge, and determining the ID of the parent edge based on the hash function value, the current scale factor, and the number of edges in the original graph data.

The determining of the direction of the parent edge may include determining a hash function value for the ID of the new edge, and determining the direction of the parent edge based on the determined hash function value.

The generating of the new edge may include determining a reference vertex based on one vertex between two vertices of the parent edge, and determining the new edge based on the determined reference vertex and the other vertex between the two vertices.

The determining of the new edge may include determining the reference vertex to be a target vertex of the new edge in response to the direction of the parent edge corresponding to a first logical value, and determining the reference vertex to be a source vertex of the new edge in response to the direction of the parent edge corresponding to a second logical value.

An ID of the reference vertex may be determined based on an ID of one vertex between the two vertices of the parent edge, the number of vertices in the original graph data, and the current scale factor.

The graph upscaling method may further include temporarily storing the new edge in a buffer of the main memory.

The graph upscaling method may further include asynchronously storing, in an auxiliary memory, a graph stored in the buffer based on a quantity of data stored in the buffer.

According to another example embodiment, there is provided a graph upscaling method including storing, in a main memory, original graph data including topological data including a vertex and an edge, allocating, to cores included in a central processing unit (CPU), IDs of edges to be generated based on the number of the cores, and generating, by each of the cores, new edges based on the allocated IDs using a hash function and the original graph data.

The generating of the new edges may include generating the new edges until a preset number is satisfied.

The preset number may include a product of the number of edges in the original graph data and a final scale factor.

The cores may use the same hash function.

The graph upscaling method may further include temporarily storing the new edges in a buffer of the main memory, and asynchronously storing, in an auxiliary memory, a graph stored in the buffer based on a quantity of data stored in the buffer.

The new edges may be generated in parallel by the cores.

According to still another example embodiment, there is provided a graph upscaling apparatus including a processor configured to store, in a main memory, original graph data including topological data including a vertex and an edge, determine a parent edge using a hash function and the original graph data, and generate a new edge based on the determined parent edge.

According to yet another example embodiment, there is provided a graph upscaling apparatus including a CPU including a plurality of cores, and a controller configured to store, in a main memory, original graph data including topological data including a vertex and an edge and allocate, to the cores, IDs of edges to be generated based on the number of the cores. Each of the cores may generate new edges based on a corresponding ID allocated to each of the cores using a hash function and the original graph data.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

An existing graph upscaling method may lose most of properties of an original graph, and require numerous memories because all graph data need to be loaded into the memories while the graph is being upscaled, and use a great amount of time to upscale the graph due to a great amount of calculations.

However, a graph upscaling method according to an example embodiment may upscale an original graph extremely fast while maintaining properties of the original graph using small computer equipment. In detail, the graph upscaling method may add an edge through hash-based and recursive preferential attachment based on evolution of the original graph, without sampling and parameterizing the original graph, and may thus upscale the original graph to a graph of a greater scale without losing a structural property of the original graph.

Graph data described herein may include topological data. The topological data may include information associated with vertices included in the graph data, and information associated with a relationship or connection among the vertices, for example, information associated with edges. The information associated with edges may include information on two vertices forming an edge, and a direction of the edge (e.g., a direction of the edge from a first vertex to a second vertex, or a direction of the edge from the second vertex to the first vertex). For example, the information associated with edges include information on a source vertex which is a start point of an edge, and a target vertex which is an end point of the edge. Each of the edges and each of the vertices may receive an identity (ID) allocated to a corresponding edge or vertex through a preset method.

A graph upscaling apparatus according an example embodiment may upscale a graph based on original graph data. When the original graph data is storable in a main memory, the graph upscaling apparatus may upscale an entire graph to a graph of up to a trillion-unit scale. The graph upscaling apparatus may perform a recursive hash function based on an original graph to generate a new edge without loading all graphs generated during the upscaling, and thus upscale a graph without limitations in terms of scale using a memory corresponding to the original graph.

In addition, the graph upscaling apparatus may process all tasks needed for graph upscaling through parallelization and distribution.

Hereinafter, a graph upscaling method and apparatus that adds an edge through hash-based recursive preferential attachment based on evolution of an original graph will be described.

Figure 1:
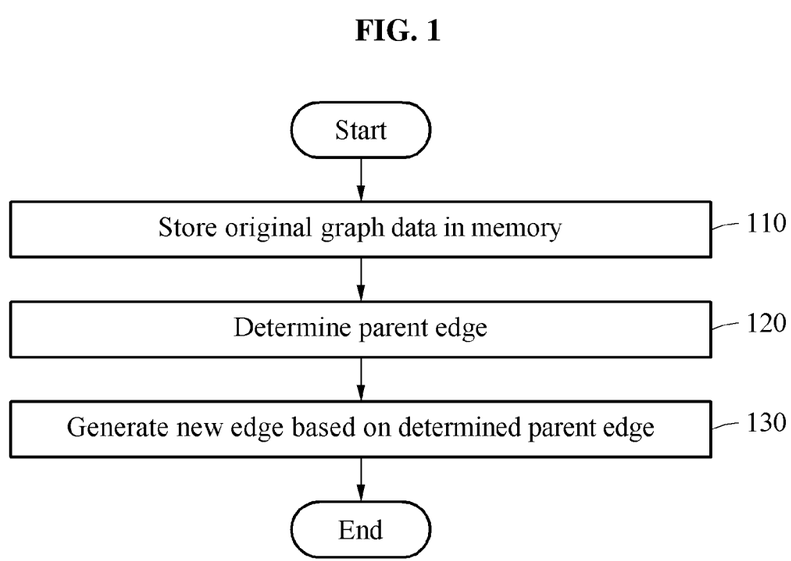
FIG. 1 is a flowchart illustrating an example of a graph upscaling method according to an example embodiment.

FIG. 1 is a flowchart illustrating an example of a graph upscaling method according to an example embodiment.

Referring to FIG. 1, a graph upscaling method includes operation 110 of storing, in a main memory, original graph data including topological data including a vertex and an edge. The original graph data may refer to graph data that is a reference for graph upscaling, and graph data including information associated with all vertices and edges.

Only the original graph data is stored in the main memory without loading all graphs generated in an upscaling process into a memory, and thus it is possible to upscale a graph to any scale without a restriction of scale using an amount of the memory corresponding an original graph. Hereinafter, the memory may include the main memory.

The graph upscaling method includes operation 120 of determining a parent edge using a hash function and the original graph data, and operation 130 of generating a new edge based on the determined parent edge. The hash function may refer to a function that maps data of a random length to data of a set length.

According to an example embodiment, it is possible to upscale a graph by repeating an operation of generating an edge. Here, a parent edge may be a reference edge used to generate a new edge. The new edge may be generated based on the parent edge, and it is thus possible to upscale a graph to a graph of a greater scale while maintaining a structural property of original graph data.

Figure 2:
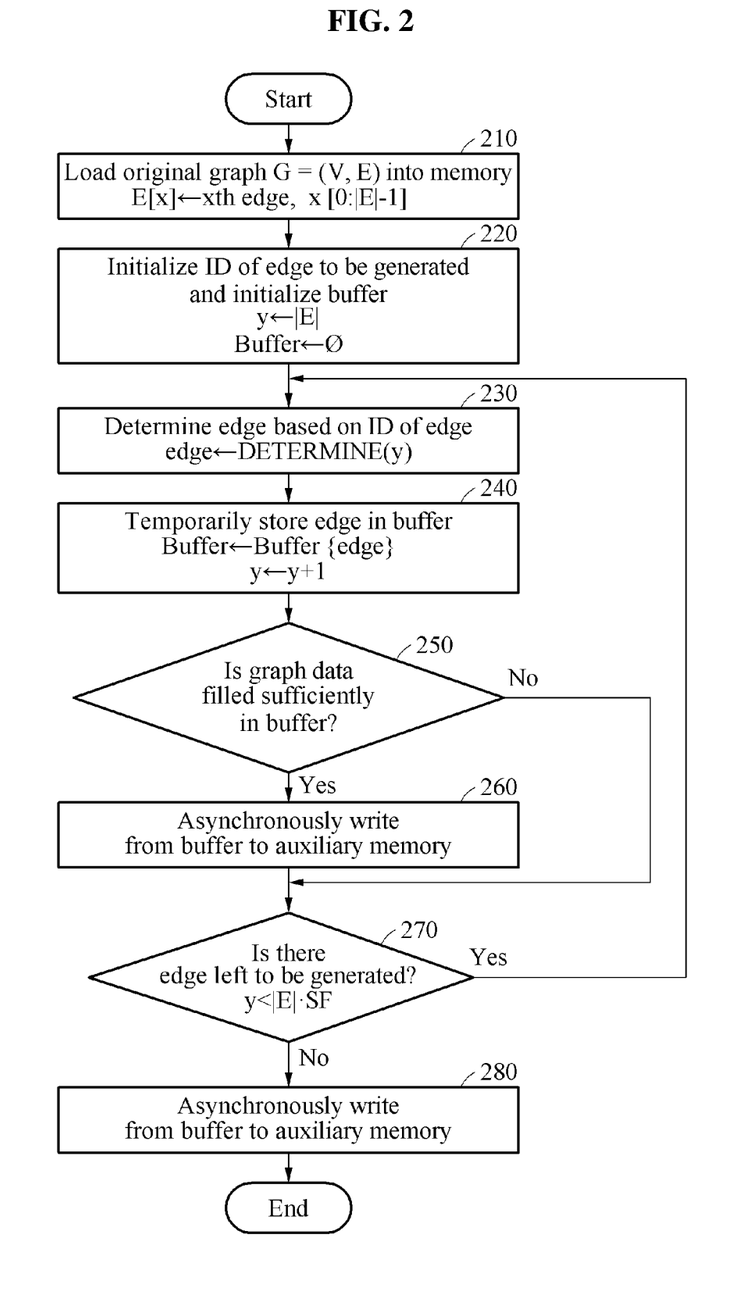
FIG. 2 is a flowchart illustrating an example of upscaling an original graph to a graph of a greater scale according to an example embodiment.

FIG. 2 is a flowchart illustrating an example of upscaling an original graph to a graph of a greater scale according to an example embodiment.

Referring to FIG. 2, a graph upscaling method includes operation 210 of loading an original graph into a memory. The original graph may include topological data [G=(V, E)] including a vertex V and an edge E. Here, E[x] denotes an xth edge included in the original graph, and |E| denotes the number of edges included in the original graph. For example, when |E| is 6, the original graph may include six edges from E[0] to E[5].

The graph upscaling method includes operation 220 of initializing an ID of an edge to be generated, and a buffer. Here, the ID of the edge to be generated may be indicated by y. The ID y of the edge to be generated may be initialized to be the number |E| of the edges included in the original graph. Since IDs of the edges included in the original graph are allocated from 0 to (|E|−1), the ID y of the edge to be generated may start from |E|. For example, when |E| is 6, y may be initialized to be 6.

The graph upscaling method includes operation 230 of determining an edge based on an ID of each edge. Hereinafter, operation 230 of determining an edge based on an ID of each edge will be described in detail with reference to FIG. 3.

Operations 240 through 280 are performed to temporarily store the edge determined in operation 230 in an upscaled graph buffer of a main memory, and asynchronously write an upscaled graph in an auxiliary memory from the upscaled graph buffer of the main memory.

In detail, the graph upscaling method includes operation 240 of temporarily storing, in the buffer, the edge generated in operation 230, and updating y to y+1. Here, such operation of storing a generated edge in a buffer, updating an ID of the edge, and generating one edge may be repeated in sequential order of IDs of edges to upscale a graph. For example, when an edge corresponding to y being 6 (y=6) is generated, the generated edge may be temporarily stored in the buffer, and y may be updated to 7 (y=7).

The graph upscaling method includes operation 250 of determining whether the buffer is filled with a sufficient amount of data and determining whether to perform the writing in the auxiliary memory. When the buffer is determined to be sufficiently filled, the graph upscaling method includes operation 260 of performing asynchronous writing in the auxiliary memory from the buffer.

The graph upscaling method includes operation 270 of determining whether there is a remaining edge to be generated. After determining whether there is a remaining edge to be generated and generating all remaining edges, the graph upscaling method includes operation 280 of performing asynchronous writing of all data remained in the buffer of the main memory into the auxiliary memory. For example, when there is a remaining edge to be generated, the graph upscaling method may return to operations prior to operation 230, and perform the operations to generate the edge based on an ID of the edge until all edges are generated.

The number of edges need to be generated may be a product of the number |E| of edges in original graph data and a final scale factor (SF). The product is a value obtained by multiplying the number |E| of the edges in the original graph data and the final SF. An SF may be a parameter corresponding to the number of upscaling cycles, and the final SF may be the number of upscaling cycles preset and input by a user. For example, when |E|=6 and SF=3, the number of edges to be generated may be 18. Thus, until all the 18 edges are generated, or a 17th edge is generated, necessary operations may need to be performed. However, when edges up to a 15th edge are currently generated, the graph upscaling method may return to the operations prior to operation 230 and generate remaining edges until all edges are generated with respect to IDs of the remaining edges.

Figure 3:
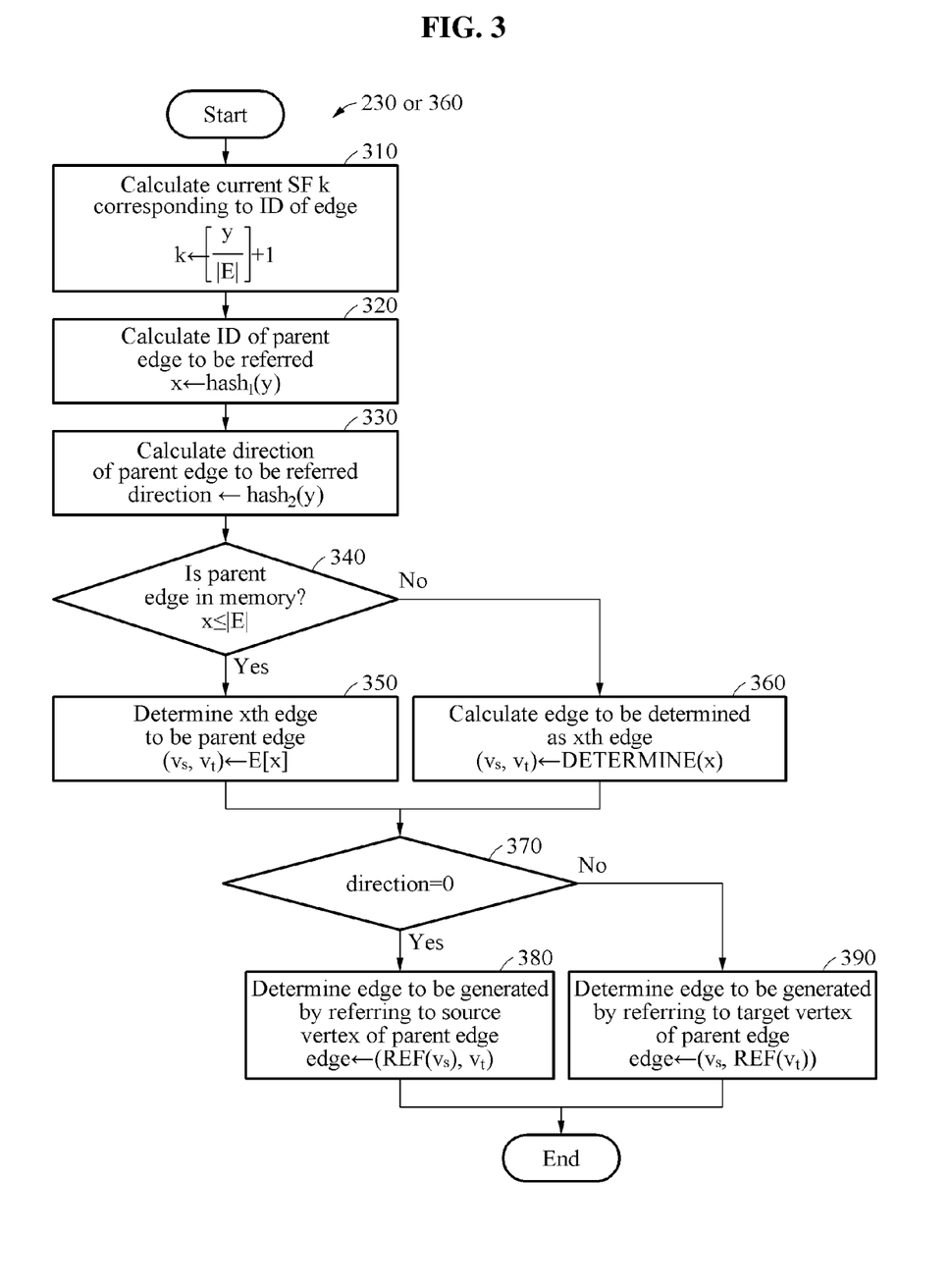
FIG. 3 is a flowchart illustrating an example of determining an edge based on an identity (ID) of the edge according an example embodiment.

FIG. 3 is a flowchart illustrating an example of determining an edge based on an ID of the edge according an example embodiment.

Referring to FIG. 3, an operation of determining an edge may be performed by adding, to an original graph, an edge through evolutionary hash-based recursive preferential attachment, without sampling and parametrizing the original graph. Thus, it is possible to upscale the original graph to a graph of a greater scale while maintaining a structural property of the original graph, without decomposing and sampling the original graph. In addition, by performing such recursive hash function-based preferential attachment, it is possible to generate an upscaled graph by loading, into a main memory, only the original graph without loading all upscaled graphs generated in an upscaling process.

In operation 310, a current SF k for an ID of an edge to be generated is calculated. The current SF k may be calculated as represented by Equation 1.

$$k=[y/|E|]+1 \qquad \text{[Equation 1]}$$

In Equation 1, y denotes an ID of an edge to be generated and |E| denotes the number of edges included in original graph data. [x] denotes a Gaussian symbol, indicating a greatest integer that is not greater than x. For example, when y=6 and |E|=6, the current SF k is 2 (k=2). The current SF k may have a value greater than or equal to 1, and less than a final SF.

In operation 320, an ID x of a parent edge to which the ID of the edge to be generated refers is calculated. The ID x of the parent edge is determined based on a hash function and original graph data. The determining of the ID x of the parent edge will be described in detail with reference to FIG. 4.

In operation 330, a direction of the parent edge to which the ID of the edge to be generated refers is calculated. The direction of the parent edge is determined based on a hash function and the original graph data. The direction of the parent edge may have two directions corresponding to a first logical value and a second logical value. The first logical value may be, for example, 1. The second logical value may be, for example, 0. The determining of the direction of the parent edge will be described in detail with reference to FIG. 5.

In operation 340, whether the parent edge is present in a memory, for example, a main memory, is determined. In operation 350, when the parent edge is determined to be in the memory, the parent edge is determined to be an xth edge in the original graph. In operation 360, when the parent edge is determined not to be in the memory, the parent edge is determined through a recursive operation.

Here, only the original graph may be loaded in the memory. When the parent edge is in the memory, for example, when x<|E|, an edge corresponding to an ID of the parent edge in the original graph is determined to be the parent edge. For example, when |E|=6 and x=4, x<|E| and thus a fourth edge may be determined to be the parent edge because the parent edge is in the memory.

When the parent edge is not in the memory, for example, when x>|E|, information of an edge corresponding to the parent edge is not in the memory. Thus, when there is no information of the edge corresponding to the parent edge in the memory, the parent edge may be determined based on the recursive operation. The recursive operation may be a repetitive calculation to find an edge to be determined as the parent edge, the calculation being repeated until it is available using the original graph data. For example, when |E|=6 and x=7, x>|E| and thus a seventh edge may be determined to be the parent edge through the recursive operation because there is not parent edge in the memory. Based on the recursive operation, x for which y is 7 (y=7) is obtained in operation 320. For example, x for which y is 7 (y=7) may be 4. When x=4, x<|E| and thus an edge, for example, the seventh edge, for which y is 7 (y=7) may be obtained.

In operation 370, the direction of the parent edge is determined. In operation 380, when the determined direction corresponds to the second logical value, the edge to be generated is determined by referring to a source vertex of the parent edge. In operation 390, when the determined direction corresponds to the first logical value, not the second logical value, the edge to be generated is determined by referring to a target vertex of the parent edge.

An operation of generating a new edge may include determining one between a source vertex and a target vertex of the new edge to be a reference vertex, and determining the other between the source vertex and the target vertex of the new edge, based on a vertex and a direction of a parent edge.

For example, when the direction of the parent edge corresponds to 0, the new edge may be generated by determining a reference vertex based on a source vertex of the parent edge, and determining a target vertex of the new edge based on a target vertex of the parent edge with the determined reference vertex being a source vertex of the new edge. The determining of the reference vertex will be described in detail with reference to FIG. 6.

Figure 4:
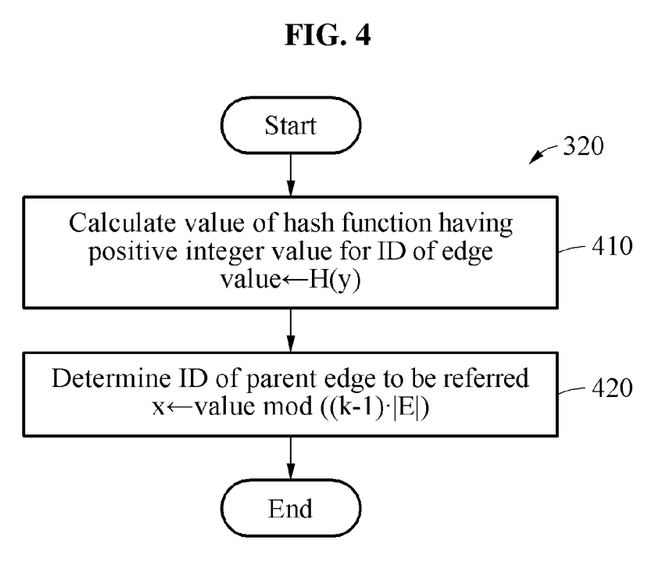
FIG. 4 is a flowchart illustrating an example of determining an ID of a parent edge to which an ID of an edge refers according to an example embodiment.

FIG. 4 is a flowchart illustrating an example of determining an ID of a parent edge to which an ID of an edge refers according to an example embodiment.

Referring to FIG. 4, in operation 410, a hash function value, which is indicated by a value, is calculated through a hash function having a positive integer value for an ID of an edge.

In operation 420, an ID of a parent edge to which the ID of the edge refers is determined. The ID of the parent has an integer value in a uniform distribution of [0:(k−1)*|E|−1] as represented by Equation 2 which may be a value of the hash function obtained through an operation, for example, mod.

$$x = \text{value} \bmod ((k-1)*|E|) \qquad [\text{Equation 2}]$$

For example, when a value of a hash function H(y) for y being 6 (y=6) and |E| being 6 (|E|=6) is 12, k is 2 (k=2) and an ID x of a parent edge is 12 mod 6, and thus x is 0 (x=0). In this example, the parent edge may be a 0th edge.

Figure 5:
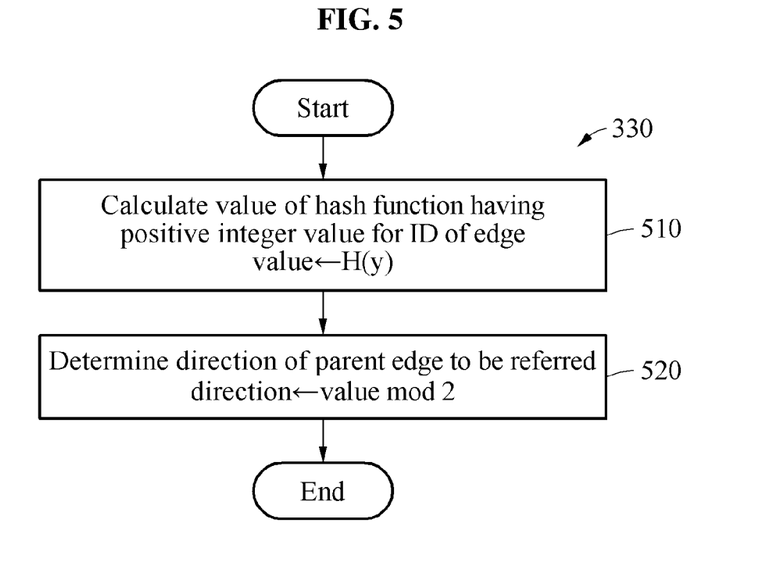
FIG. 5 is a flowchart illustrating an example of determining a direction of a parent edge to which an ID of an edge refers according to an example embodiment.

FIG. 5 is a flowchart illustrating an example of determining a direction of a parent edge to which an ID of an edge refers according to an example embodiment.

Referring to FIG. 5, in operation 510, a value of a hash function is calculated through the hash function having a positive integer value for an ID of an edge.

In operation 520, a direction of a parent edge to be referred to is determined. The direction of the parent edge has an integer value in a uniform distribution of [0:1] as represented by Equation 3, which is a value of the hash function obtained through an operation, for example, mod.

$$\text{direction} = \text{value} \bmod 2 \qquad [\text{Equation 3}]$$

For example, when a value of a hash function H(y) for y being 6 (y=6) and |E| being 6 (|E|=6) is 12, a direction of a parent edge is 12 mod 2 (direction=12 mod 2), and thus the direction corresponds to 0 (direction=0).

Figure 6:
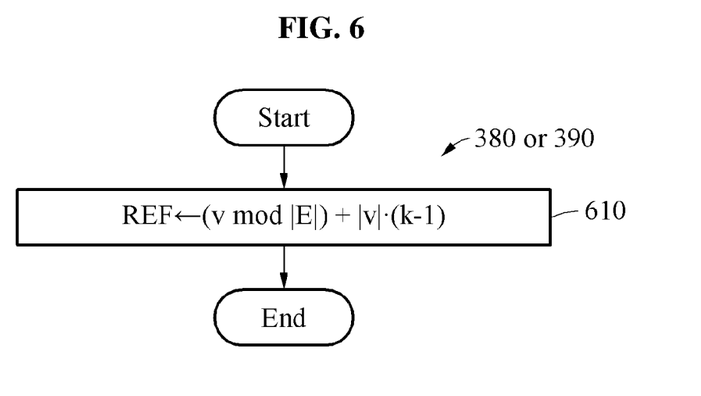
FIG. 6 is a flowchart illustrating an example of determining a reference vertex according to an example embodiment.

FIG. 6 is a flowchart illustrating an example of determining a reference vertex according to an example embodiment.

Referring to FIG. 6, in operation 610, a reference vertex REF(v) corresponding to a current SF k with respect to a vertex v of a parent edge is calculated. As represented by Equation 4, the reference vertex REF(v) is calculated based on the number |V| of vertices in an original graph and the current SF k.

$$\text{REF} = (v \bmod |V|) + |V|*(k-1) \qquad [\text{Equation 4}]$$

For example, when y=6, |E|=6, and |V|=5, a parent edge is a 0th edge and a direction thereof corresponds to 0 (direction=0). In this example, when two vertices of the parent edge, for example, the 0th edge, are indicated by ($v_0$, $v_1$), the direction is 0 and thus the reference vertex REF(v) is generated based on a source vertex $v_0$. By calculating the reference vertex REF(v) based on the source vertex $v_0$, REF=0 mod 5+5=5. Thus, an edge to be newly and finally generated may be indicated by ($v_5$, $v_1$).

Figure 7:
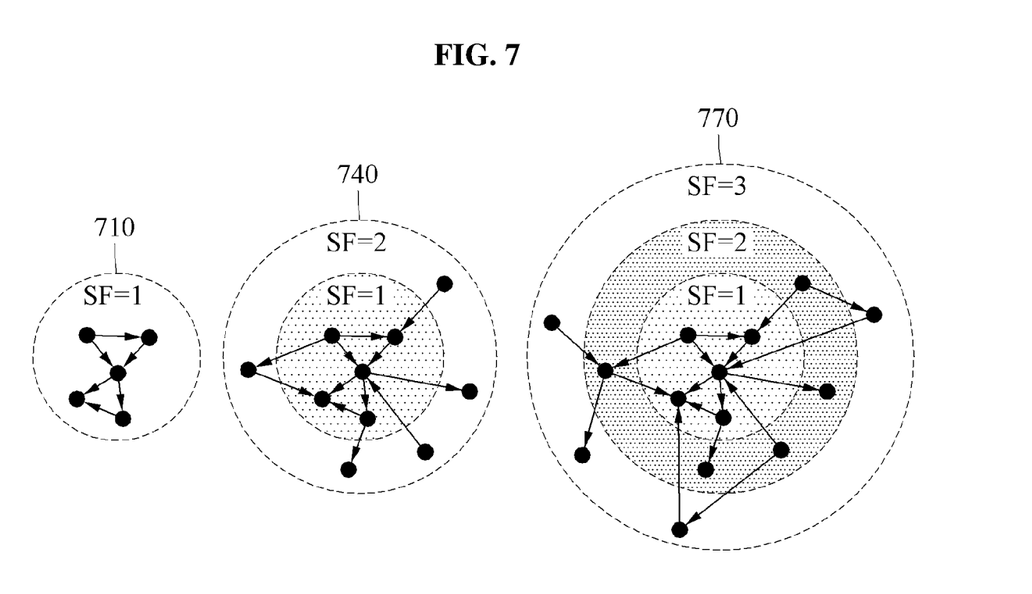
FIG. 7 is a diagram illustrating an example of evolutionary graph generation according to an example embodiment.

FIG. 7 is a diagram illustrating an example of evolutionary graph generation according to an example embodiment.

Referring to FIG. 7, an SF of an original graph 710 including a total of five vertices and six edges is 1. An SF of a graph 740 is 2, and a new vertex and a new edge are added to the original graph 710 through an evolutionary method. Here, a new edge may be generated between a vertex in a previous graph and a newly added vertex. An SF of a graph 770 is 3, and a new vertex and a new edge are added to a previous graph of a previous scale through the evolutionary method.

Figure 8:
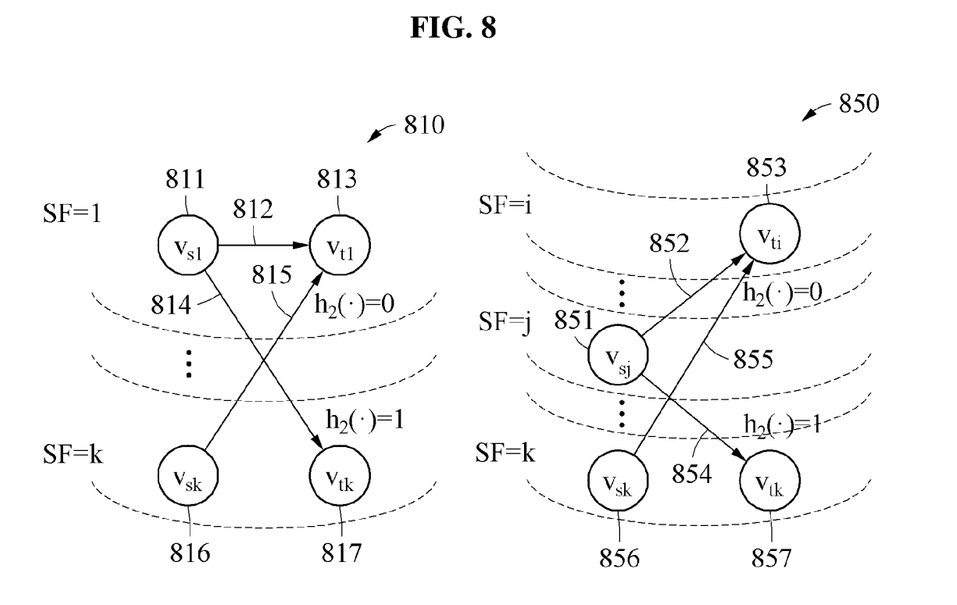
FIG. 8 is a diagram illustrating an example of determining an edge according to an example embodiment.

FIG. 8 is a diagram illustrating an example of determining an edge according to an example embodiment.

Referring to FIG. 8, an edge is formed with vertices corresponding to a same SF, and vertices corresponding to another SF.

A new edge is determined from a parent edge which is indicated by $v_{s1}$ 811 and $v_{t1}$ 813 in an original graph 810 with an SF of 1. Based on a hash function $h_2(\cdot)$, an edge 815 ($v_{sk}$ 816, $v_{t1}$ 813) or an edge 814 ($v_{s1}$ 811, $v_{tk}$ 817) is determined.

A new edge is determined from a parent edge ($v_{sj}$ 851, $v_{ti}$ 853) in an upscaled graph 850. Based on a hash function $h_2(\cdot)$, an edge 855 ($v_{sk}$ 856, $v_{ti}$ 853) or an edge 854 ($v_{sj}$ 851, $v_{tk}$ 857) is determined.

Figure 9:
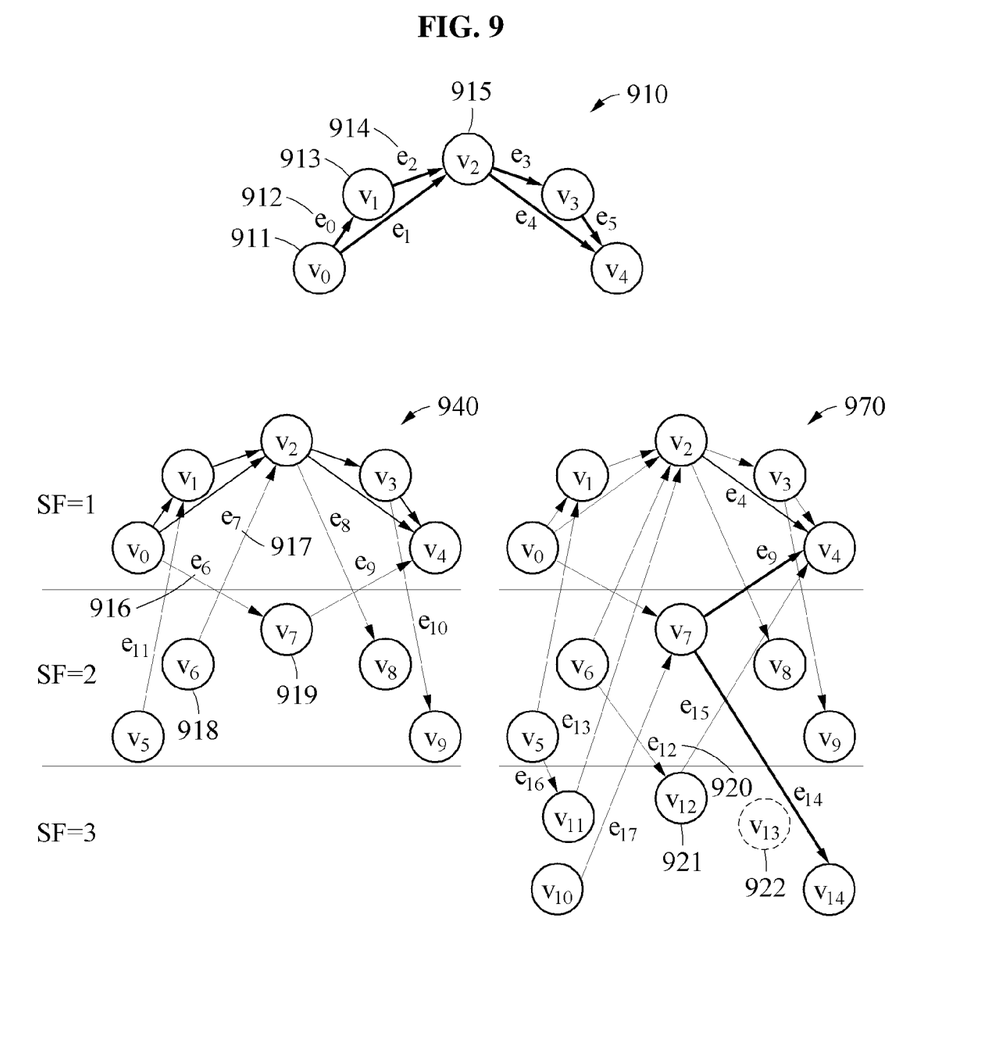
FIG. 9 is a diagram illustrating an example of obtaining an upscaled graph from an original graph according to an example embodiment.

FIG. 9 is a diagram illustrating an example of obtaining an upscaled graph from an original graph according to an example embodiment.

Referring to FIG. 9, an original graph 910 includes five vertices $v_0$ 911, $v_1$ 913, $v_2$ 915, $v_3$, $v_4$, and $v_5$, and six edges $e_0$ 912, $e_1$, $e_2$ 914, $e_3$, $e_4$, $e_5$, and $e_6$.

A graph 940 is upscaled by an SF of 2. The upscaling is performed through an edge connection process connecting five new vertex candidates and the existing vertices. Six edges are determined and connected. All the six edges are connected to the five new vertex candidates, and thus five new vertices are all actual vertices.

For example, in a case of an edge $e_7$ 917, a current SF k is 2 and |E| is 6. To obtain an ID x of a parent edge on which generation of the edge $e_7$ 917 is based, the ID x is 2 (x=2) because x=14 mod 6 under the assumption that H(7) is 14 (H(7)=14). To obtain a direction of the parent edge, direction=14 mod 2, and thus the direction corresponds to 0 (direction=0). Since the ID x of the parent edge is 2, which is less than |E| being 6 (|E|=6), the edge $e_2$ 914 ($v_1$ 913, $v_2$ 915) is determined to be the parent edge. Since the direction is 0, a source vertex of $e_7$ 917 is a reference vertex of which value REF=1 mod 6+5=6. Thus, the finally generated edge $e_7$ 917 is indicated by ($v_6$ 918, $v_2$ 915).

A graph 970 is upscaled by an SF of 3. The upscaling is performed through an edge connection process connecting five new vertex candidates and the existing vertices. However, a vertex $v_{13}$ 922 is not connected.

For example, in a case of an edge $e_{12}$ 920, a current SF k is 3 and |E| is 6. To obtain an ID x of a parent edge on which generation of the edge $e_{12}$ 920 is based, the ID x is 7 (x=7) because x=19 mod 12 under the assumption that H(12) is 18 (H(12)=8). To obtain a direction of the parent edge, direction=19 mod 2, and thus the direction corresponds to 1 (direction=1). Since the ID x of the parent edge is 7, which is greater than |E| being 6 (|E|=6), the edge $e_7$ 917 is obtained through a recursive operation. Through the recursive operation to obtain the edge $e_7$ 917, the edge $e_7$ 917 is indicated by ($v_6$ 918, $v_2$ 915). Thus, the edge $e_7$ 917 ($v_6$ 918, $v_2$ 915) is determined to be the parent edge. Since the direction is 1, a target vertex of the edge $e_{12}$ 920 is a reference vertex of which value REF=2 mod 6+5*2=12. Thus, the finally generated edge $e_{12}$ 920 is indicated by ($v_6$ 918, $v_{12}$ 921).

According to an example embodiment, a graph upscaling apparatus may include a processor configured to store, in a main memory, original graph data including topological data including a vertex and an edge, determine a parent edge using a hash function and the original graph data, and generate a new edge based on the determined parent edge.

Figure 10:
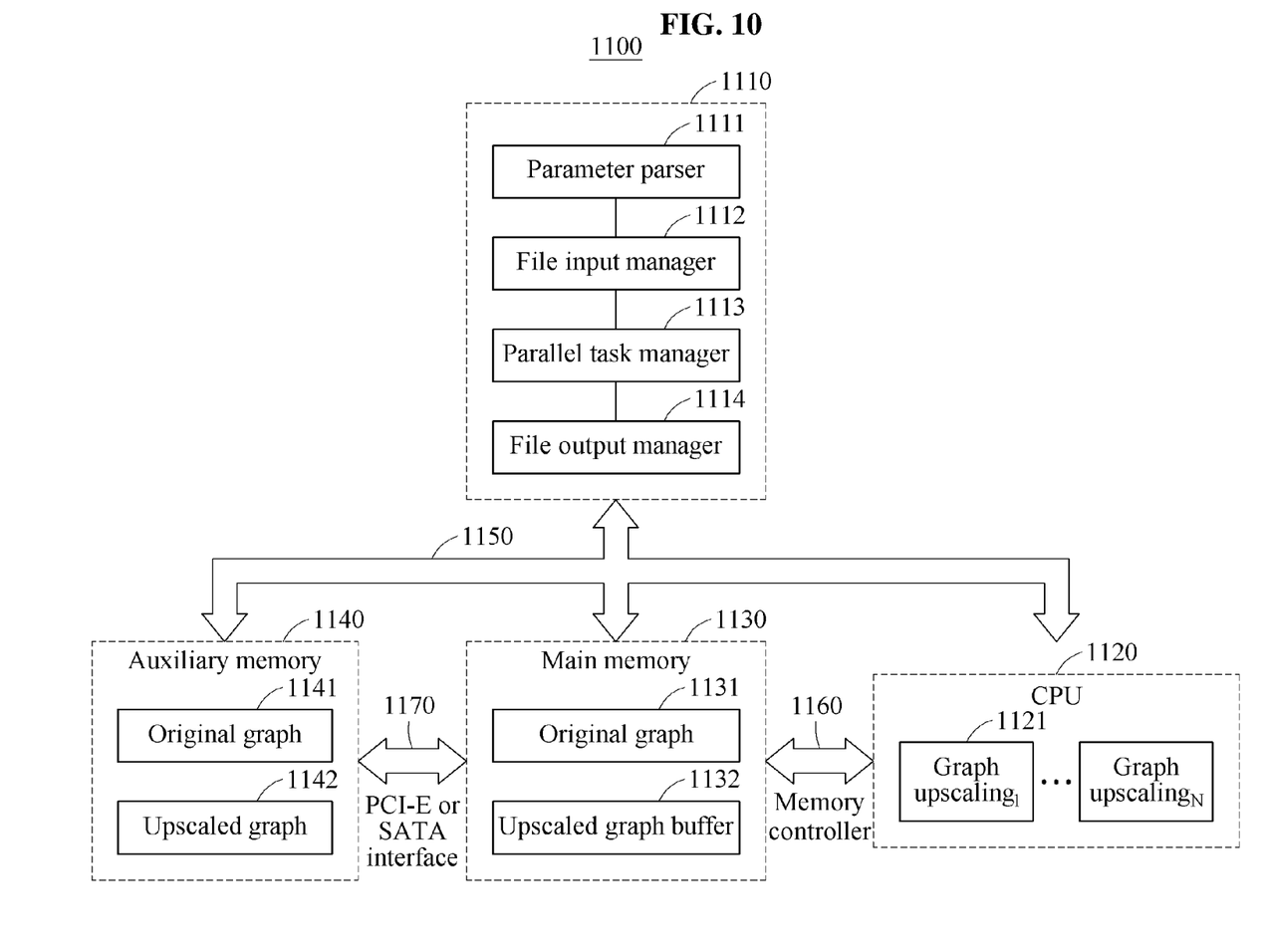
FIG. 10 is a diagram illustrating an example of a graph upscaling apparatus according to an example embodiment.

FIG. 10 is a diagram illustrating an example of a graph upscaling apparatus according to an example embodiment.

Referring to FIG. 10, a graph upscaling system 1100 includes a control group 1110 and a hardware device. The control group 1110 controls the hardware device as indicated by an arrow 1150.

The control group 1110 includes a parameter parser 1111 configured to configure an entire workload of a graph upscaling method by receiving, from a user, parameters, for example, an SF indicating a scale by which a graph is to be upscaled and a path in which an original graph is stored, that are required to perform the graph scaling method, a file input manager 1112 configured to load original graph data from various data sources before graph upscaling, a parallel task manager 1113 configured to distribute workloads and process them in parallel, and a file output manager 1114 configured to store, in an auxiliary memory from a buffer of a main memory, sets of upscaled graph data generated through the graph upscaling system 1100 stored in the buffer.

The hardware device included in the graph upscaling system 1100 includes a central processing unit (CPU) 1120 which may be provided as a plurality of CPUs, a main memory 1130, and at least one auxiliary memory 1140.

The CPU 1120 is configured to allocate, to each core, a graph upscaling task 1121 of generating a graph upscaled from an original graph from the parallel task manager 1113. Here, the number of graph upscaling tasks 1121 may be determined based on a level of parallelization and the number N of cores included in the CPU 1120. The cores may use a same hash function.

The main memory 1130 includes an original graph 1131 to store entire original graph data, and an upscaled graph buffer 1132 to temporarily store data generated during graph upscaling before writing the data in the auxiliary memory 1140. The CPU 1120 and the main memory 1130 may be connected through a memory controller 1160. The main memory 1120 and the auxiliary memory 1130 may be connected through a peripheral component interconnect express (PCI-E) or a serial advanced technology attachment (SATA) interface 1170. According to an example, they may be connected through other various interfaces. Here, at least an entirety of the auxiliary memory 1140 may need to be sufficiently large to include all upscaled graphs.

The parameter parser 1111 is configured to configure an entire workload of graph generation by receiving, from a user, parameters, for example, a location of an original graph 1141 stored in the auxiliary memory 1140 and an SF.

The file input manager 1112 is configured to load, into the original graph 1131 of the main memory 1130, data received from the parameter parser 1111, from the location of the original graph 1141 in the auxiliary memory 1140.

The parallel task manager 1113 is configured to parallelize and distribute all tasks for graph upscaling to divide the graph upscaling into N tasks and allocate a divided graph upscaling task, for example, the graph upscaling task 1121, to each core of the CPU 1120.

The file output manager 1114 is configured to output, to an upscaled graph 1142 in the auxiliary memory 1140, a portion of upscaled graphs temporarily stored during graph upscaling from the upscaled graph buffer 1132 of the main memory 1130.

According to an example embodiment, a graph upscaling method may include storing, in a main memory, original graph data including topological data including a vertex and an edge, allocating IDs of edges to be generated to cores included in a CPU, based on the number of the cores, and generating, by the cores, new edges based on the IDs of the edges using a hash function and the original graph data. The cores may generate the new edges until a preset number of edges is satisfied.

Referring back to FIG. 2, in operation 210, the parameter parser 1111 and the file input manager 1112 load the original graph 1141 of the auxiliary memory 1140 into the original graph 1131 of the main memory 1130.

In operation 220, the parameter parser 1111 and the file input manager 1112 initialize an ID of an edge to be generated and a space of a buffer using a total number |E| of edges in the obtained original graph.

In operation 230, the parallel task manager 1113 allocates the graph upscaling task 1121 to each core of the CPU 1120 based on a parallelization and distribution level. The graph upscaling task 1121 may include determining edges corresponding to allocated IDs. New edges to be generated based on IDs of edges to be generated may be processed in parallel by the cores. Each of the edges may be determined through a recursive operation based on the original graph 1131 in the main memory 1130.

In operation 240, when each of the cores generates an edge corresponding to an ID of the edge, it temporarily stores data in the upscaled graph buffer 1132 of the main memory 1130.

In operation 250, the file output manager 1114 determines whether data is sufficiently filled in the upscaled graph buffer 1132.

In operation 260, in response to a determination that the data is sufficiently filled in the upscaled graph buffer 1132, the file output manager 1114 asynchronous writes upscaled graphs temporarily stored in the upscaled graph buffer 1132 into the upscaled graph 1142 of the auxiliary memory 1140.

In operation 270, the file output manager 1114 determines whether there is an ID of a remaining edge left to be generated. In operation 280, in response to a determination that there is no edge to be generated, the file output manager 1114 asynchronous writes, into the auxiliary memory 1140, all data left in the upscaled graph buffer 1131 of the main memory 1130. However, when there is an edge left to be generated, the graph upscaling method returns to operations prior to operation 230, and perform edge generation for IDs of all remaining edges until all edges in a range of remaining vertices are generated.

According to example embodiments described herein, there is provided a method of upscaling an actual scale-free graph to a graph of a greater scale in a parallel processing machine. The method may upscale an original graph to a graph of a greater scale while maintaining a structural property of the original graph by adding an edge through hash-based and recursive preferential attachment based on evolution of the original graph without sampling or parameterizing the original graph in the parallel processing machine.

Dissimilar to existing methods that sample and parameterize a graph, the method may use evolutionary graph upscaling without decomposing an original graph, and may thus maintain a structural property of the original graph.

The method may not require preprocessing including sampling and parametrization, and thus may effectively obtain an upscaled graph. In addition, the method may determine an edge based on a hash function, and may thus enable effective graph upscaling through parallelization.

In addition, the method may perform a recursive hash function on an original graph when generating a new edge, without loading all graphs generated in an upscaling process into a memory, and may thus perform graph upscaling using only a memory corresponding to the original graph without limitations in terms of scale.

In addition, the method may be fast in generation by a factor of 1680 or greater times in terms of speed, compared to existing synthetic graph generating and upscaling methods.

In addition, the method may be considerably effective in terms of scalability because it upscales an original graph up to a graph of a trillion-unit scale as long as only a size of the original graph is loadable in a memory, compared to existing synthetic graph generating and upscaling methods which upscale a graph up to a billion-unit scale.

In addition, in terms of maintaining a graph property, the method may be effective in upscaling an original graph to a graph of a greater scale while maintaining a structural property of the original graph through preferential attachment using a mechanism by which a graph evolves over time, without sampling a graph and extracting a parameter, compared to existing synthetic graph generating and upscaling methods which upscale a graph through sampling and parameterization and thus lose most of structural properties of the graph through preprocessing including graph decomposition and parameter extraction.

Further, the method may apply a graph upscaling method to a trained small artificial neural network in addition to a graph, and thus upscale the network to an artificial neural network having a higher level of accuracy.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs. and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like.

Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A graph upscaling method comprising:
   storing, in a main memory, original graph data including topological data including a vertex and an edge;
   determining a parent edge using a hash function and the original graph data;
   generating a new edge based on the determined parent edge; and
   determining a current scale factor based on an identity (ID) of the new edge,
   wherein the determining of the parent edge comprises:
     determining an ID of the parent edge; and
     determining a direction of the parent edge
   wherein the determining of the ID of the parent edge comprises:
     determining a hash function value for the ID of the new edge; and
     determining the ID of the parent edge based on the hash function value, the current scale factor, and the number of edges in the original graph data,
   wherein the generating of the new edge comprises:
     determining a reference vertex based on a first vertex among two vertices of the parent edge; and
     determining the new edge based on the determined reference vertex and a second vertex among the two vertices, and
   wherein an ID of the reference vertex is determined based on an ID of the first vertex among the two vertices of the parent edge, the number of vertices in the original graph data, and a current scale factor.

2. The graph upscaling method of claim 1, wherein the determining of the parent edge comprises:
   determining whether a first parent edge for the new edge is included in the original graph data;
   in response to a determination that the first parent edge is not included in the original graph data, finding a edge to be determined as the first parent edge by performing a recursive operation; and
   determining the first parent edge based on the found edge.

3. The graph upscaling method of claim 1, further comprising:
   determining a current scale factor based on the ID of the new edge, wherein the parent edge is determined based further on the determined current scale factor.

4. The graph upscaling method of claim 1, wherein the determining of the direction of the parent edge comprises:
   determining a hash function value for an ID of the new edge; and
   determining the direction of the parent edge based on the determined hash function value.

5. The graph upscaling method of claim 1, wherein the determining of the new edge comprises:
   in response to a direction of the parent edge corresponding to a first logical value, determining the reference vertex to be a target vertex of the new edge; and
   in response to a direction of the parent edge corresponding to a second logical value, determining the reference vertex to be a source vertex of the new edge.

6. The graph upscaling method of claim 1, further comprising:
   temporarily storing the new edge in a buffer of the main memory.

7. The graph upscaling method of claim 6, further comprising:
   asynchronously storing, in an auxiliary memory, a graph stored in the buffer based on a quantity of data stored in the buffer.

8. A graph upscaling apparatus comprising:
   a central processing unit (CPU) including a plurality of cores; and
   a controller configured to store, in a main memory, original graph data including topological data including a vertex and an edge and allocate, to the cores, identities (IDs) of edges to be generated based on the number of the cores,
   wherein each of the cores is configured to generate new edges based on a corresponding ID allocated to each of the cores using a hash function and the original graph data,
   wherein the controller configured to generate the new edges until a preset number is satisfied,
   wherein the preset number includes a product of the number of edges in the original graph data and a final scale factor,
   wherein the each of the cores is configured to determine a parent edge using the hash function and the original graph data, and generate new edges based on the determined parent edge,
   wherein the each of the cores is configured to:
     determine a reference vertex based on a first vertex among two vertices of the parent edge; and
     determine a new edge based on the determined reference vertex and a second vertex among the two vertices, and
   wherein an ID of the reference vertex is determined based on an ID of the first vertex among the two vertices of the parent edge, the number of vertices in the original graph data, and a current scale factor.

* * * * *